(No Model.)

F. H. DIBBLE.
HORSE CANOPY.

No. 279,139. Patented June 12, 1883.

UNITED STATES PATENT OFFICE.

FRANK H. DIBBLE, OF ANSONIA, CONNECTICUT.

HORSE-CANOPY.

SPECIFICATION forming part of Letters Patent No. 279,139, dated June 12, 1883.

Application filed March 31, 1883. (No model.)

*To all whom it may concern:*

Be it known that I, FRANK H. DIBBLE, a citizen of the United States, residing at Ansonia, in the county of New Haven and State of Connecticut, have invented certain new and useful Improvements in Horse-Canopies, of which the following is a specification, reference being had therein to the accompanying drawings.

This invention relates to improvements in covers or awnings for shielding horses and other draft-animals from rain and the rays of the sun while attached to a vehicle.

The invention consists in constructing the frame-work upon which the cover, of canvas or other material, is supported with upright rods capable of vertical adjustment to or from and also longitudinally along the shafts of the vehicle to which the awning is attached, and with other rods at the top, capable of transverse adjustment, to adapt the device for use with either single or double teams, all as hereinafter described and claimed.

Figure 1:
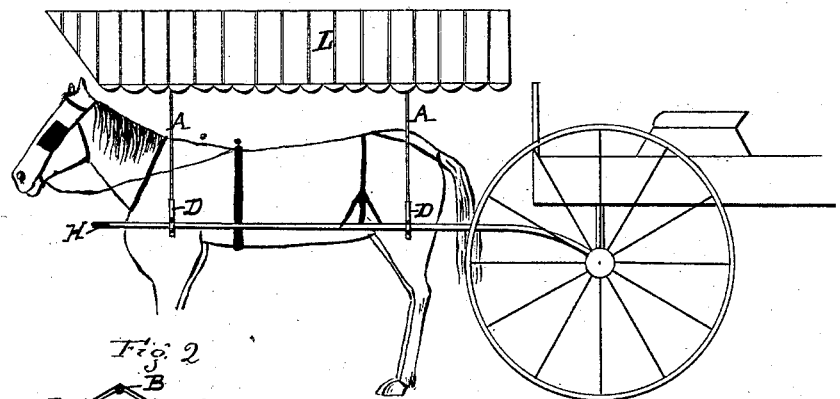
Figure 2:
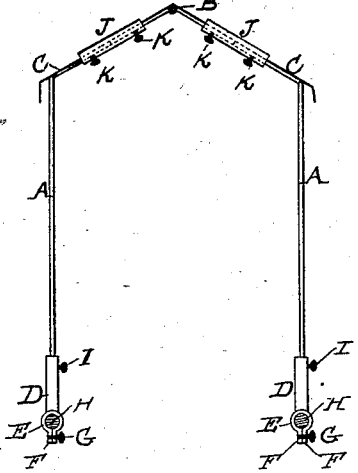
Figure 3:
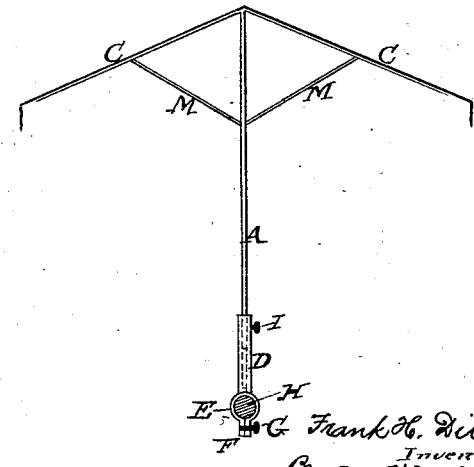

In the drawings, Figure 1 represents in side elevation my improved awning or cover in position. Fig. 2 represents an end elevation of the awning shown in Fig. 1. Fig. 3 represents an end elevation of the awning as applied to the central draft-pole of a vehicle.

In the form of awning or shade shown in Figs. 1 and 2 the framing consists of vertical side rods or bars, A, and a roof or top composed of a longitudinal bar or rod, B, and inclined bars or rods C.

D represents short sleeves or tubes, each having at its lower end a curved or circular extension, E, having flanges F F, through which a thumb-screw, G, passes, as shown.

When it is desired to place the awning in position the flanged extensions E F are opened out and either slipped over at or slid along the shafts H to the position desired, and then clamped firmly thereon by means of the thumb-screws G. The lower ends of the side rods or bars, A, are then inserted within the upper ends of the sleeves D and clamped firmly in position therein by the thumb-screws I. By this arrangement it will be observed that the height of the awning or cover above the horse can be readily adjusted, as by loosening the thumb-screws I the side bars A can be either raised or lowered within the sleeves D, and the position of the framing upon the shafts can also be readily adjusted, as by loosening the thumb-screws G the sleeves D can be slid longitudinally along the shafts whenever desired. The inclined bars or rods C are each formed in two pieces, and have bearing and slide in sleeves J, each member being clamped in position in said sleeves by a thumb-screw, K. By this means, whenever it is found necessary to increase the width of the framing, which would be the case when it is desired to cover or shield more than one horse, or where it is desired to apply one of the awnings at different times to shafts of different widths, such adjustment can be readily accomplished by simply loosening the thumb-screws K and sliding the rods C either inward or outward, as the case may be.

The lower members of the two-part bars or rods C are shown in the drawings as formed integrally with the upper portions of the vertical side bars, A. They may, however, if desired, be formed separately therefrom and attached to said side bars by rivets, bolts, or any suitable and well-known means.

L represents the cover, which may be of any suitable material, either waterproofed or not, as desired, and attached to the roof of the frame in any convenient manner.

In Fig. 3 I have shown the cover or shade as adapted for use on a wagon having a single draft-pole. In this case, instead of employing bars or rods A at each side, said bars are at their upper ends attached to or formed integrally with the inclined bars C at the center thereof, and said bars C are supported and braced by braces M, extending outward from the bars or rods A to the under side of said bars C, the vertical and longitudinal adjustment of the bars A being accomplished in this form in the same manner as that heretofore described with reference to the form shown in Figs. 1 and 2 of the drawings.

The adjustability of the several parts of the framing renders this device especially adapted for use on vehicles of different widths, and for single and double teams. It is also rendered very portable and easily packed and stowed away, all of which is apparent.

Having thus described my invention, what I claim therein is—

The combination, in a horse-canopy, of the vertically-adjustable bars A, transversely-adjustable bars C, and the sleeves D E F, and thumb-screws G, substantially as and for the purpose set forth.

In testimony whereof I affix my signature in presence of two witnesses.

FRANK H. DIBBLE.

Witnesses:
M. P. DWYER,
F. HEINZE.